United States Patent Office 3,267,174
Patented August 16, 1966

3,267,174
ACRYLIC COATING COMPOSITION CONTAINING AN ADDUCT OF A TRIOL WITH AN ALKYLENE OXIDE
John S. Fry and Glenn S. Peacock, Somerville, Joseph W. Hagan, Scotch Plains, and George A. Senior, Jr., Bloomfield, N.J., assignors to Union Carbide Corporation, a corporation of New York
No Drawing. Filed May 10, 1963, Ser. No. 279,589
9 Claims. (Cl. 260—848)

The invention relates to novel coating compositions. More particularly, the invention relates to novel, easily cured, storage stable, one package, water or solvent soluble or liquid high solids acrylic coating compositions having good flexibility, impact resistance, chemical resistance, color, and gloss which are prepared by crosslinking acrylic acid copolymer and polyalkylene polyol combinations with a potentially thermosetting formaldehyde-derived resin.

Thermosetting acrylic acid or methacrylic acid-containing copolymer formulations are known to yield coatings having a spectrum of good properties. It has been found, however, that when attempts are made to optimize a particular property, as by variation in the composition of an acrylic copolymer or the crosslinking method employed, other desirable properties are diminished to an unsatisfactory level, and often destroyed.

Acrylic coating compositions heretofore available have had the serious disadvantage that they often must be applied from volatile organic solvents. Moreover, the viscosity of the coating composition solution varies with the amount and kind of dissolved coating material, and the molecular weight of the coating material in solution and the total solids content of the solution composition are limited by the solvating power of the particular solvent vehicle. While organic solvent solutions of acrylic polymer are satisfactory for some applications, they are unsatisfactory for many others.

Aqueous coating compositions containing dispersed particles of polymeric coating material avoid the disadvantages attendant to a solvent vehicle and permit the use of higher molecular weight polymeric coating material and higher solids content than is possible with organic solvent solution coating compositions. Such latex compositions, however, are inferior to organic solvent solution coating compositions in several important respects, and as a result, their application has been restricted mainly to use as "water-based" paints for interior use. The latex coating compositions are often unsatisfactory in applications where the coatings are subjected to extreme conditions of moisture, sunlight, temperature variations, solvents, abrasion, and the like. Further, since film formation in dispersion coatings depends on particle coalesence, and since particle coalesence depends on resin softness and flow, hard films can be produced only with difficulty. For these reasons, and partly because of generally poor pigment dispersing capacity, coatings deposited from aqueous polymer dispersions often do not have the important feature of high gloss required for most protective film applications such as the painting of automobiles and appliances.

A most desirable coating system, therefore, will be:
(1) A one-package system.
(2) Storage stable for a minimum period of six months.
(3) Soluble both in water and organic solvents, and useful in the liquid high solids form.
(4) Easily cured at baking temperatures of 250–350° C. in 10 to 30 minutes.

The coating formulation when cured will:
(1) Be water, aqueous ammonia, detergent, gasoline, and turpentine resistant.
(2) Pass the Mandrel Test (ASTM D–522–41, described in detail hereinafter). No cracking or crazing of the cured coating will occur upon rapid bending of a coated panel.
(3) Have good gloss and be clear or light in color.
(4) Pass the Gardner impact resistance test, i.e., withstand at least 28 inch-pounds upon impact without cracking or peeling on the concave side of the indentation.

It is the object of this invention to present coating compositions having the above-listed features and advantages.

The coating compositions of this invention particularly adapted for protective coating applications comprise three essential components:
(1) An interpolymer of
(a) From about 0 to 90 percent by weight of a combined monovinyl aromatic hydrocarbon containing from 8 to 11 carbon atoms inclusive;
(b) From about 10 to 90 percent by weight of a combined compound selected from the group consisting of an alkyl acrylate containing from 4 to 15 carbon atoms inclusive, an alkyl methacrylate containing from 5 to 16 carbon atoms inclusive, cyanoethyl acrylate, cyanopropyl acrylate, cyanobutyl acrylate, acrylamide, N,N-dialkyl acrylamide wherein the alkyl groups contain from 1 to 6 carbon atoms inclusive, and hydroxyalkyl acrylate and hydroxyalkyl methacrylate wherein the alkyl group contains from 2 to 4 carbon atoms inclusive;
(c) From 0 to about 50 percent by weight of a combined compound selected from the group consisting of $\alpha,\beta$-olefinically unsaturated nitriles containing from 3 to 9 carbon atoms inclusive, vinyl acetate, vinyl chloride, vinyl fluoride, vinylidene chloride, and vinylidene fluoride; and
(d) From about 1 to 20 percent by weight of a combined $\alpha,\beta$-olefinically unsaturated carboxylic acid containing from 1 to 10 carbon atoms inclusive,
Said interpolymer having a reduced viscosity of from 0.1 to 0.8, and preferably from 0.15 to 0.3, measured as a 0.2 gram sample of the interpolymer in 100 milliliters of tetrahydrofuran at 25° C., and a glass transition temperature ($Tg$) of at least 25° C.
(2) From about 1 to 70 percent by weight, based on the weight of the interpolymer, of a reactive polyol, hereinafter fully described.
(3) From about 5 to 35 percent by weight, based on the weight of the interpolymer, of a potentially thermosetting resin, formed by condensation of formaldehyde with a member selected from the group consisting of phenols, urea, and triazines, particularly melamines and alkyl and aryl substituted melamines wherein the alkyl groups contain from 1 to 6 carbon atoms inclusive and the aryl groups contain from 6 to 10 carbon atoms inclusive. Ethers of the formaldehyde condensation products can also be used to advantage in this invention. Examples of such potentially thermosetting formaldehyde-derived resins include trimethylolphenol, butylated melamine-formaldehyde resin, dimethylol cyclic ethylene urea-formaldehyde resin, urea-formaldehyde resin, benzoguanamineformaldehyde resin and, most preferred in this invention, hexamethylol melamine hexamethyl ether.

The monovinyl aromatic hydrocarbons contemplated for use in the interpolymer component include such compounds as styrene, p-methylstyrene, o-methylstyrene, and m-methylstyrene; m-ethylstyrene; p-fluorostyrene, o-chlorostyrene, 2,6-dichlorostyrene, m-trifluoromethylstyrene, o-cyanostyrene, m-nitrostyrene, p-nitrostyrene, vinyl naphthalene, $\alpha$-methylstyrene and the like. Styrene is preferred because of its ready availability and low cost.

The alkyl acrylates contemplated for use in the interpolymer component are exemplified by such compounds as methyl acrylate, ethyl acrylate, isopropyl acrylate, n- butyl acrylate, isobutyl acrylate, n-amyl acrylate, n-hexyl acrylate, 2-ethylhexyl acrylate, n-octyl acrylate, n-decyl acrylate, and the like. Ethyl acrylate is preferred because of its ready availability and low cost.

The alkyl methacrylates contemplated for use in the interpolymer component are exemplified by such compounds as methyl methacrylate, ethyl methacrylate, n-butyl methacrylate, isobutyl methacrylate, n-amyl methacrylate, 2-ethylhexyl methacrylate, n-octyl methacrylate, n-decyl methacrylate, and the like. Methyl methacrylate is preferred because of its ready availability and low cost.

The hydroxyalkyl methacrylates contemplated for use in the interpolymer component are exemplified by such compounds as hydroxyethyl methacrylate, hydroxypropyl methacrylate, hydroxybutyl methacrylate, and the like. Corresponding hydroxyalkyl acrylates are also contemplated.

The $\alpha,\beta$-olefinically unsaturated nitriles contemplated fore use in their interpolymer component are exemplified by such compounds as acrylonitrile, $\alpha$-chloroacrylonitrile, $\alpha$-trifluoromethylacrylonitrile, and the like. Acrylonitrile is preferred because of its ready availability and low cost.

The $\alpha,\beta$-olefinically unsaturated carboxylic acids contemplated for use in the interpolymer component are exemplified by such compounds as the preferred compound acrylic acid, methacrylic acid, crotonic acid, cinnamic acid, atropic acid, $\alpha$-chloroacrylic acid, $\alpha$-fluoroacrylic acid, maleic acid, fumaric acid, itaconic acid, monoisopropyl maleate, mono-n-butyl fumarate, and the like. Where the high liquid solids version of the invention is employed the $\alpha,\beta$-unsaturated carboxylic acid can be replaced by an unsaturated alcohol-containing monomer such as, for example, hydroxyethyl acrylate, hydroxypropyl acrylate, hydroxyethyl methacrylate, hydroxypropyl methacrylate, the monoallyl ether of trimethylolpropane, allyl alcohol, and the like, or by an amine or amide monomer such as acrylamide and methacrylamide. Since ammonia neutralization is unnecessary in the high solids version crosslinking is possible through either carboxyl, hydroxyl, amino, or amide groups.

It is a particular feature of this invention that the formulations described herein can be prepared for use in any one of three forms: (A) liquid high solids (i.e., about 93 to 100 percent by weight non-volatile componens); (B) solvent soluble; (C) water dilutable. The type of reactive polyol or combination of polyols used as a component herein depends on which of these forms it is desired to use.

Where it is desired to employ solvent soluble and water soluble systems, the following groups of reactive polyols and combinations thereof, hereinafter referred to as "Type I polyols," are preferably used:

(a) Hydroxy-terminated polyesters and polyesterethers.
(b) Alkylene oxide adducts of polyhydroxyalkanes.
(c) Alkylene oxide adducts of non-reducing sugars and sugar derivatives.
(d) Alkylene oxide adducts of aromatic amine/phenol/aldehyde ternary condensation products.
(e) Alkylene oxide adducts of phosphorus and polyphosphorous acids, and various hydroxy-terminated phosphites and phosphonates.
(f) Alkylene oxide adducts of polyphenols.
(g) Polytetramethylene glycols.

Less desired because of their inherently poor water resistance, but still useful in some cases, are the following groups of reactive polyols:

(h) Alkylene oxide adducts of trialkanol amines.
(i) Alcohols derived from aliphatic amines by addition of alkylene oxides.

Illustrative hydroxyl-terminated polyesters are those prepared by polymerizing a lactone (preferably an epsilon-caprolactone) in the presence of an active hydrogen-containing starter as described in U.S. 2,914,556. Copolymers of lactones and alkylene oxides can also be used.

Illustrative of alkylene oxide adducts of polyhydroxy alkanes are the ethylene oxide, propylene oxide, epoxybutane and the like, and mixtures thereof, adducts of ethylene glycol, propylene glycol, 1,3-dihydroxypropane, 1,3-dihydroxybutane, 1,4-dihydroxybutane, 1,4-, 1,5-, and 1,6-dihydroxyhexane, 1,2-, 1,3-, 1,5-, 1,6-, and 1,8-dihydroxyoctane, 1,10-dihydroxydecane, glycerol, 1,2,4-trihydroxybutane, 1,2,6-trihydroxyhexane, 1,1,1-trimethylolethane, 1,1,1-trimethylolpropane, pentaerythritol, xylitol, arabitol, sorbitol, mannitol, and the like. Particularly preferred are the ethylene oxide, propylene oxide, and butylene oxide adducts of dihydroxyalkanes and trihydroxyalkanes.

Illustrative of alkylene oxide adducts of non-reducing sugars and sugar derivatives are the alkylene oxide adducts, wherein the alkylene oxide contains from 2 to 4 carbon atoms inclusive, of sucrose, alkyl glycosides such as methyl and etehyl glycoside, and the like, polyol glycosides, such as ethylene glycol glucoside, glycerol glucoside, and 1,2,6-hexanetriol glucoside, and the like.

Illustrative of the alkylene oxide adducts, preferably the ethylene oxide, 1,2-epoxypropane, epoxybutane, and mixtures therof, adducts of aromatic amine/phenol/aldehyde ternary condensation products are those materials prepared by condensing an aromatic amine, for example, aniline, toluidine, and the like, a phenol such as phenol, cresol, and the like, and an aldehyde, preferably formaldehyde, at a temperature of from about 60 to 180° C. The condensation product is then recovered and caused to react with alkylene oxide in the presence of a basic catalyst such as potassium hydroxide if desired, to produce the polyol.

Illustrative of alkalene oxide adducts of phosphorus and polyphosphorus acids are the ethylene oxide, 1,2-epoxypropane, the epoxybutanes, 3-chloro-1,2-epoxypropane, and the like, adducts of phosphoric acid, phosphorus acid, the polyphosphoric acids such as tripolyphosphoric acid, the polymetaphosphoric acids, and the like.

Illustrative of useful alkylene oxide adducts of polyphenols are those adducts wherein the alkylene oxides contain from 2 to 4 carbon atoms inclusive such as, for example, bisphenol-A, bisphenol-F, condensation products of phenol and formaldehyde, more particularly the novolac resins, condensation products of various phenolic compounds and acrolein such as 1,1,3-tris(hydroxyphenyl)propane, condensation products of various phenolic compounds and glyoxal, glutaraldehyde, and like dialdehydes such as 1,1,2,2-tetrakis(hydroxyphenyl) ethane.

The Type I polyols described above can range in hydroxyl number from about 20 to 800, and preferably from about 25 to 450. Hydroxyl number is defined as the number of milligrams of potassium hydroxide required for the neutralization of the hydrolysis product of the fully acetylated derivative prepared from one gram of polyol. Hydroxyl number can also be defined by the equation:

$$OH = \frac{56.1 \times 1000 \times f}{MW}$$

where

OH=hydroxyl number of the polyol
$f$=functionality, i.e., average number of hydroxyl groups per molecule of polyol
MW=molecular weight of the polyol.

When it is desired to employ a liquid high solids system, it is usually preferred that the viscosity of the system be reduced to make handling, transfer, and coating more efficiently performed. Accordingly, when a liquid high solids system is used one or more members of a second type of reactive polyol, hereinafter referred to as Type II polyol, can be substituted for all or any part of the Type I polyol in those formulations previously described for solvent soluble and water dilutable systems. Type II polyols are low molecular weight diols which are compatible with the liquid high solids system and which reduce the viscosity of the system. Type II polyols have hydroxyl numbers which can vary from about 500 to 1800, and preferably from about 800 to 1500. Illustrative of Type II polyols are such diols as octylene glycol, diethylene glycol, triethylene glycol, tetraethylene glycol, propylene glycol, dipropylene glycol, tripropylene glycol, tetrapropylene glycol, dibutylene glycol, hexylene glycol, the monoallyl ether of trimethylol propane, 2-methyl-2-ethyl-1,3-propanediol, 2-ethyl-1,3-hexanediol, 2-hydroxymethyl-2-methylbutyl-2-hydroxymethyl-2-methylbutyrate, and the like.

The relative proportion of Type I polyol and Type II polyol used is dependent upon the desired hardness of flexibility of the coating. In general, higher proportions of Type I polyol lead to more flexible coatings while higher proportions of Type II polyol lead to harder coatings.

Type II polyols can also be used in the solvent soluble and water dilutable systems but offer no particular advantage inasmuch as necessity for reduced viscosity is obviated by addition of more water or solvent.

Where it is desired to employ liquid high solids and solvent soluble systems, it is preferred that the interpolymer component of the coating composition comprises from about 30 to 60 percent by weight combined ethyl acrylate, from about 20 to 60 percent by weight combined styrene, and from about 5 to 15 percent by weight combined acrylic acid.

Where it is desired to employ a water soluble system, it is preferred that the interpolymer component comprises from about 30 to 60 percent by weight combined ethyl acrylate, from about 0 to 25 percent by weight combined styrene, from about 15 to 60 percent by weight combined methyl methacrylate, and from about 5 to 20 percent by weight combined acrylic acid.

Water solubility of the acrylic interpolymers described herein is achieved by reaction of the interpolymer with aqueous ammonia to form the corresponding ammonium salt. Usually an equivalent of aqueous ammonia per mole of carboxyl group presented in the interpolymer is used, although an excess of ammonia can be added if desired. Less than an equivalent of ammonia can also sometimes be added with resulting water solubility.

It is not essential that a catalyst be used in preparing the coating compositions of this invention. If desired, however, any of a wide variety of conventional organic solvent soluble, or water soluble or water-dispersible, catalysts can be employed in catalytic amounts. Catalysts which have been found to be well suited for use herein are such compounds as the sulfonic acids and derivatives thereof, such as, for example, p-toluene sulfonic acid, methyl-p-toluene sulfonic acid, and the like.

Colorants, fillers, pigments and the like can be added to the compositions of the invention if desired.

EXAMPLES

The following examples illustrate the invention.
The following tests were employed:
*Water resistance.*—Water immersion test (ASTM D-870-54).
*Solvent resistance.*—Gasoline and ethyl alcohol: a coated panel is rubbed with (A) high octane gasoline or (B) ethyl alcohol and the degree of coating softening or removal is noted.
*Impact resistance.*—Gardner impact test: a coating is rapidly distended by dropping a known weight through a known distance onto a coated panel, causing a deep hemispherical indentation.

Mandrel test (ASTM D-522-41): as a check on the balance of adhesion against distensibility, a coated panel is rapidly bent through a 180° angle in a conical shape measuring ⅛-inch to 2¼ inches from the apex of the cone to the base. No cracking or crazing of coating should occur.

*Example 1*

Equipment consisting of a two-liter resin kettle fitted with a stirrer, reflux condenser, thermometer, nitrogen inlet, and two dropping funnels was assembled. Into one of the dropping funnels was charged the following monomer-solvent solution:

|  | Weight in Grams | Parts by Weight |
|---|---|---|
| Ethyl Acrylate | 250 | 50 |
| Styrene | 225 | 45 |
| Acrylic Acid (glacial) | 25 | 5 |
| 1,4-Dioxane | 293 |  |
| t-Dodecyl Mercaptan | 4 |  |

Into the other dropping funnel was charged the following catalyst-solvent solution:

| | Parts by weight |
|---|---|
| 1,4-dioxane | 40 |
| Benzoyl peroxide | 5 |

Part (80 g.) of the monomer-solvent solution was added to the resin kettle and heated to 90° C. Ten grams of the catalyst-solvent solution was then added. The remainder of the monomer-solvent solution was gradually added over a two-hour period while the remainder of the catalyst-solvent solution was added at fifteen minute intervals in 5 gram increments. The reaction mixture was held at 100° C. for an additional five hours and then discharged. The solids measured were 60.0 percent (versus theoretical solids of 60.4 percent). This polymer solution will be referred to as Acrylic Polymer I.

*Example 2*

The following control formulation was prepared:

| | Parts by weight |
|---|---|
| Acrylic polymer I | 60 |
| Butylated melamine-formaldehyde resin, 50% non-volatiles | 18.0 |
| p-Toluene sulfonic acid | 0.025 |
| Ethylene glycol monoethyl ether | 20 |

The following experimental formulation was prepared:

| | Parts by weight |
|---|---|
| Acrylic polymer I | 60 |
| Butylated melamine-formaldehyde resin, 50% non-volatiles | 18.0 |
| Triol [a] | 4.0 |
| p-Toluene sulfonic acid | 0.025 |
| Ethylene glycol monoethyl ether | 20 |

[a] A polyoxypropylene triol having an average molecular weight of 700 and an average hydroxyl number of 240.

The control and experimental formulations were dip coated onto separate bright steel panels, air dried thirty minutes and baked for thirty minutes at 300° F. Three mil films resulted which in each case were completely resistant to 17 percent aqueous ammonia and gasoline in five minute spot tests. The control formulation failed a 20 inch-pound Gardner impact test, but the experimental formulation passed a 40 inch-pound forward and reverse Gardner impact test.

*Example 3*

The following table of formulations illustrates variations of Example 2. All values are parts by weight.

|  | Control 1 | Example 3A | Example 3B |
|---|---|---|---|
| Acrylic Polymer I | 60 | 60 | 60 |
| Butylated melamineformaldehyde resin, 50% non-volatiles | 12 | 12 | 12 |
| Triol [a] |  | 8 | 6 |
| Diol [b] |  |  | 8 |
| p-Toluene Sulfonic Acid | 0.025 | 0.025 | 0.025 |
| Ethylene glycol monoethyl ether | 20 | 20 | 20 |

[a] A polyoxypropylene triol having an average molecular weight of 700 and an average hyroxyl number of about 240.
[b] A polyoxypropylene diol having an average molecular weight of 400 and an average hyroxyl number of 265.

Three mil films of each formulation were prepared on steel panels as described in Example 2. Each formulation was resistant to aqueous ammonia and gasoline. Control 1 failed a 30 inch-pound impact test while Example 3A passed a 60 inch-pound impact test. Example 3B passed a 70 inch-pound impact test. Panels of the examples did not fail on water immersion at 100° F. for 1000 hours.

Example 4

An acrylic interpolymer consisting of 80 percent by weight combined ethyl acrylate and 20 percent by weight combined acrylic acid was prepared in accordance with the procedure outlined in Example 1. This copolymer was obtained as a 67.2 percent by weight solution in dioxane and will be referred to as Acrylic Polymer II.

Water-diluted coatings of Acrylic Polymer II were prepared. These systems were considered water soluble in that clear solutions were obtained which produced continuous films on air drying.

|  | Parts by Weight ||
|---|---|---|
|  | Control | Example |
| Acrylic Polymer II | 100.0 | 100.0 |
| Methylated Melamine-formaldehyde resin (80% non-volatiles) | 25.2 | 25.2 |
| Aqueous ammonia (30%) | 16.6 | 16.6 |
| Water | 17.33 | 17.33 |
| p-Toluene sulfonic acid | 0.27 | 0.27 |
| Triol a | --------- | 7.5 | a A polyoxypropylene triol having an average molecular weight of about 700 and a hydroxyl number of about 241.

Coatings were prepared and baked as described in Example 2. The resulting films were 1.9–2.0 mils thick and exhibited complete gasoline resistance. The control passed only a 10 inch-pounds impact resistance test but the flexibilized example passed a 50 inch-pounds impact test.

Example 5

An acrylic polymer solution similar to Acrylic Polymer I was prepared which contained 58.7 percent by weight solids. This solution, Acrylic Polymer III, was combined with various non-reactive plasticizers and polypropylene triol and crosslinked with a formaldehyde-derived resin as in Example 2. The composition of the formulations is tabulated below:

|  | Parts by Weight |||
|---|---|---|---|
|  | Example | Control 1 | Control 2 |
| Acrylic Polymer III | 68.1 | 68.1 | 68.1 |
| Hexamethylol melamine hexamethyl ether | 6 | 6 | 6 |
| Triol a | 4 | --------- | --------- |
| Tricresyl phosphate | --------- | 5 | --------- |
| Butyl benzyl phthalate | --------- | --------- | 4 |
| p-Toluene sulfonic acid | 0.025 | 0.025 | 0.025 |
| Ethylene glycol monoethyl ether | 20 | 20 | 20 | a A polyoxypropylene triol having an average molecular weight of about 700 and a hydroxyl number of about 241.

The formulations were coated onto bonderized steel panels, air dried for one hour, and baked for 30 minutes at 300° F. Both controls and example exhibited good aqueous ammonia resistance. The gasoline resistance of the example was perfect whereas the gasoline resistance of Controls 1 and 2 was rated 60 and 70 percent effective, respectively.

This example demonstrates the superiority of a reactive hydroxyl-containing flexibilizing agent over commonly used plasticizers.

Example 6

That other reactive hydroxyl-containing flexbilizing agents are useful is illustrated by the formulations described below:

|  | Parts by Weight |||
|---|---|---|---|
|  | Example |||
|  | A | B | C |
| Acrylic Polymer III | 86.1 | 86.1 | 86.1 |
| Butylated melamineformaldehyde resin | 7.5 | 7.5 | 7.5 |
| Triol I a | 5 | --------- | --------- |
| Triol II b | --------- | 5 | --------- |
| Triol III c | --------- | --------- | 5 |
| p-Toluene sulfonic acid | 0.1 | 0.1 | 0.1 |
| Toluene | 26.4 | 26.4 | 26.4 | a A polyoxypropylene triol having an average molecular weight of 4400 and an average hydroxyl number of 38.
b A polyoxypropylene triol having an average molecular weight of 4400 and an average hydroxyl number of 68.
c A polyoxypropylene triol having an average molecular weight of 168 and an average hydroxyl number of 1000.

These formulations were coated onto bonderized steel panels with a drawdown blade, air dried for one hour, and baked at 250° F. for 30 minutes. All formulations passed at least a 60 inch-pounds impact test and exhibited excellent resistance to water, aqueous ammonia, and gasoline.

Example 7

An acrylic interpolymer consisting of 45 percent by weight combined ethyl acrylate, 45 percent by weight combined methyl methacrylate, 5 percent by weight combined acrylamide, and 5 percent by weight combined acrylic acid is prepared in accordance with the procedure outlined in Example 1. The polymer solution, Acrylic Polymer IV, which contains 60.7 percent by weight solids in dioxane, is converted to water diluted vehicles as shown in the following formulations:

|  | Parts by Weight |||
|---|---|---|---|
|  | Example A | Example B | Control |
| Acrylic Polymer IV | 90 | 90 | 90 |
| Aqueous ammonia, 30% | 6.7 | 6.7 | 6.7 |
| Hexamethylol melamine hexamethyl ether | 16 | 16 | 16 |
| p-Toluene sulfonic acid | 0.5 | 0.5 | 0.5 |
| Water | 98.7 | 98.7 | 98.7 |
| Triol a | 5.3 | --------- | --------- |
| Diol b | --------- | 5.3 | --------- | a A polyoxypropylene triol having an average molecular weight of 700 and an average hydroxyl number of 240.
b Polyoxyethylene diol having an average molecular weight of 300 and an average hydroxyl number of 384.

Coatings on bonderized steel panels were made with a drawdown blade, air dried for one hour, and baked for 30 minutes at 250° F. The control formulation fails a 90 inch-pound impact test while Examples A and B pass a 90 inch-pound impact test. Both examples displayed excellent water, aqueous ammonia, and gasoline resistance.

Example 8

A white baking enamel was prepared according to the following procedure.

(1) A base vehicle was formulated which had the following composition:

|  | G. |
|---|---|
| Acrylic Polymer I | 170.4 |
| Hexamethylol melamine hexamethyl ether | 20.0 |
| Triol a | 5.0 |

|  | G. |
|---|---|
| Toluene | 27.3 |
| Ethylene glycol monoethyl ether | 27.3 | a A polyoxypropylene triol having an average molecular weight of 700 and an average hydroxyl number of 240.

This vehicle will be referred to as Solution A.

(2) A pigment grind was formulated which had the following composition:

|  | G. |
|---|---|
| Solution A | 175 |
| TiO$_2$ | 450 |
| Ethylene glycol monoethyl ether | 75 |

The pigment grind was pebble milled for 16 hours.

(3) A final enamel was formulated which had the following composition:

|  | G. |
|---|---|
| Pigment grind | 123 |
| Solution A | 169.2 |
| p-Toluene sulfonic acid | 0.25 |

Bonderized steel panels were coated with the final enamel formulation, air dried for one hour and baked at 250° F. for 30 minutes. Several panels were overbaked at 300° F. for two hours with no deleterious effect on color. All panels passed a 60 inch-pound impact test, which is good impact test performance for pigmented systems, and exhibited excellent resistance to water, aqueous ammonia, and gasoline.

*Example 9*

An acrylic interpolymer, Acrylic Polymer V, was prepared as in Example 1 except that 8 g. of t-dodecyl mercaptan was used. Acrylic Polymer V had a reduced viscosity of 0.15 and a solids content of 57.6 percent by weight, versus a theoretical percentage of 60.0. The following experimental formulations were made:

|  | Parts by Weight | |
|---|---|---|
|  | Example A | Example B |
| Acrylic Polymer V | 62 | 62 |
| Hexamethylol melamine hexamethyl ether | 10 | 11 |
| Diol ᵃ | 7 | 11 |
| Hexylene glycol | 4 | 8 |
| p-Toluene sulfonic acid | 0.025 | 0.025 |

ᵃ A polyoxypropylene diol having an average molecular weight of 412 and an average hydroxyl number of 265.

The above formulations were subjected to reduced pressure at 65° C. to remove dioxane. The solids and Gardner viscosities were determined:

|  | Example A | Example B |
|---|---|---|
| Percent solids | 98 | 100 |
| Viscosity, 60° C., centipoises | 2,500 | 2,300 |

The high solids formulations were flow coated at 60° C. onto cold-rolled steel panels and baked for 30 minutes at 300° F. Four mil films resulted which exhibited excellent resistance to gasoline, 17 percent aqueous ammonia, and ethyl alcohol. The bump impact of Example A was 120 inch-pounds and that of Example B was 160 inch-pounds.

*Example 10*

Acrylic Polymer V, described in Example 9, was further tested in the following formulations:

|  | Parts by Weight | |
|---|---|---|
|  | Example A | Example B |
| Acrylic Polymer V | 62 | 62 |
| Hexamethylol melamine hexamethyl ether | 10 | 11 |
| Diol ᵃ | 8 | 6 |
| Monoallyl ether of trimethylol propane | 4 | 7 |
| p-Toluene sulfonic acid | 0.025 | 0.025 |

ᵃ A polyoxypropylene diol having an average molecular weight of 412 and an average hydroxyl number of 265.

Formulations A and B were stripped of dioxane under reduced pressure at 65° C. The solids and Gardner viscosities were determined:

|  | Example A | Example B |
|---|---|---|
| Percent solids | 96 | 98.5 |
| Viscosity, 60° C., centipoises | 2,500 | 2,300 |

Coatings were prepared as in Example 9 which resulted in four mil films which exhibited excellent resistance to gasoline, 17 percent aqueous ammonia, and ethyl alcohol. The impact resistance of Example A was 160 inch-pounds while that of Example B was 60 inch-pounds.

*Example 11*

An acrylic interpolymer, Acrylic Polymer VI, was prepared according to the procedure of Example 1. This polymer comprised 54 percent by weight combined ethyl acrylate, 34 percent by weight combined styrene, and 12 percent by weight combined monoalkyl ether of trimethylol propane. The solids content was 56.1 percent by weight, versus a theoretical solids content of 60.0 percent. The reduced viscosity was 0.17. The following formulation was prepared:

|  | Parts by weight |
|---|---|
| Acrylic Polymer VI | 64 |
| Hexamethylol melamine hexamethyl ether | 11 |
| Hexylene glycol | 7 |
| Diol ᵃ | 8 |
| p-Toluene sulfonic acid | 0.05 |

ᵃ A polyoxypropylene diol having an average molecular weight of 412 and an average hydroxyl number of 265.

After evaporation to 94 percent by weight solids, this formulation had a Gardner viscosity of 1750 centipoises at 60° C. Cold rolled steel plates were melt extrusion coated and baked for 30 minutes at 300° F. The formulation was resistant to aqueous ammonia and gasoline and had an impact resistance of 160 inch-pounds.

*Example 12*

An acrylic interpolymer, Acrylic Polymer VII, was prepared according to the method described in Example 1. Eight grams of t-dodecyl mercaptan was used in the polymerization mixture. This polymer comprised 55 percent by weight combined ethyl acrylae, 18 percent by weight combined styrene, 17 percent by weight combined methyl methacrylate, and 10 percent by weight combined acrylic acid. A solution containing 59 percent by weight solids, versus 60.4 percent by weight theoretical, was obtained. The reduced viscosity was 0.16. The following formulation was prepared:

|  | Parts by weight |
|---|---|
| Acrylic Polymer VII | 62 |
| Hexamethylol melamine hexamethyl ether | 11 |
| Diol ᵃ | 10 |
| Hexylene glycol | 8 |
| Methyl p-toluene sulfonate | 0.05 |

ᵃ A polyoxypropylene diol having an average molecular weight of 412 and an average hydroxyl number of 265.

After evaporation to 94 percent by weight solids, the Gardner viscosity at 60° C. was 2500 centipoises. A three mil coating was made with a drawdown blade at room temperature and baked for 30 minutes at 300° F. The film had excellent resistance to 17 percent aqueous ammonia, gasoline, and ethyl alcohol. The bump impact was 160 inch-pounds.

*Example 13*

An acrylic interpolymer comprising 45 percent by weight combined styrene, 40 percent by weight combined ethyl acrylate, 10 percent by weight combined acrylonitrile, and 5 percent by weight combined acrylic acid was prepared in accordance with the procedure outlined in Example 1 except that xylene was substituted for dioxane as the solvent. The polymer solution, Acrylic Polymer VIII, contained 59.1 percent by weight solids and was formulated as follows:

| | Parts by Weight | | |
|---|---|---|---|
| | Control | Example A | Example B |
| Acrylic Polymer VIII | 100 | 100 | 100 |
| Diol ᵃ | | 8 | 11 |
| Trimethylolphenol (70 percent in water) | 9.4 | 9.4 | 9.4 |
| Methyl p-toluene sulfonate | 0.1 | 0.1 | 0.1 |
| Ethylene glycol monoethyl ether | 36.6 | 36.6 | 36.6 |
| Ethyl alcohol | 5.0 | 5.0 | 5.0 |

ᵃ A polypropylene diol having an average molecular weight of 400 and an average hydroxyl number of 265.

Coatings on cold rolled steel panels were made with a drawdown blade, air dried for 30 minutes and baked for 30 minutes at 300° F. Two mil films resulted which were resistant to aqueous ammonia and gasoline. The control formulation failed all impact and mandrel bend tests while Examples A and B pass the ⅛ inch mandrel bend test and passed Gardner impact of 20 and 50 inch-pounds, respectively. These examples further illustrate the superior impact resistance of coatings containing a reactive polyol as a flexibilizing agent.

It was noted that the crosslinking agent, trimethylolphenol, was not compatible with the acrylic interpolymer and the control formulation produced a coating which displayed poor gloss and a high degree of haze. Surprisingly, however, addition of the diol in Examples A and B led to clear, glossy coatings, and no incompatibility of the acrylic interpolymer and the crosslinking agent was noted. Thus the coatings produced when a polyol is added are more attractive, as well as more flexible.

What is caimed is:
1. Coating composition comprising
   (1) An interpolymer of
   (a) from about 0 to 90 percent by weight of a combined monovinyl aromatic hydrocarbon containing from 8 to 11 carbon atoms inclusive;
   (b) from about 10 to 90 percent by weight of a combined compound selected from the group consisting of an alkyl acrylate containing from 4 to 15 carbon atoms inclusive, an alkyl methacrylate containing from 5 to 16 carbon atoms inclusive, cyanoethyl acrylate, cyanopropyl acrylate, cyanobutyl acrylate, acrylamide, N,N-dialkyl acrylamide wherein the alkyl groups contain from 1 to 6 carbon atoms inclusive, and hydroxyalkyl acrylate and hydroxyalkyl methacrylate wherein this alkyl group contains from 1 to 4 carbon atoms inclusive;
   (c) from 0 to about 50 percent by weight of a combined compound selected from the group consisting of α,β-olefinically unsaturated nitriles containing from 3 to 9 carbon atoms inclusive, vinyl acetate, vinyl chloride, vinyl fluoride, vinylidene chloride, and vinylidene fluoride; and
   (d) from about 1 to 20 percent by weight of a combined α,β-olefinically unsaturated carboxylic acid containing from 1 to 10 carbon atoms inclusive,
said interpolymer having a reduced viscosity of from 0.1 to 0.8, measured as a 0.2 gram sample of the interpolymer in 100 millimeters of tetrahydrofuran at 25° C., and a glass transition temperature (Tg) of at least 25° C.
   (2) from about 1 to 70 percent by weight, based on the weight of the interpolymer, of a reactive adduct of a triol with an alkylene oxide containing at least 3 carbon atoms, said triol having a hydroxyl number of from about 20 to 1800,
   (3) from about 5 to 35 percent by weight, based on the weight of the interpolymer, of a potentially thermosetting resin formed by condensation of formaldehyde with a member selected from the group consisting of phenols, urea, and triazines.

2. Coating composition claimed in claim 1 wherein said combined monovinyl aromatic hydrocarbon selected from the (1)(a) group is styrene, said combined compound selected from the (1)(b) group is selected from ethyl acrylate and methyl methacrylate, said combined compound selected from the (1)(c) group is acrylonitrile, said combined α,β-olefinically unsaturated carboxylic acid selected from the (1)(d) group is acrylic acid, said reactive triol adduct of group (2) is an alkylene oxide aduct of a trihydroxyalkane, and said potentially thermosetting resin of group (3) is formed by condensation of formaldehyde with a melamine.

3. Coating composition claimed in claim 2 wherein said potentially thermosetting resin is hexamethylol melamine hexamethyl ether.

4. Coating composition claimed in claim 3 wherein the hydroxyl number of said alkylene oxide adduct of a trihydroxyalkane is from about 25 to 450.

5. Liquid high solids coating composition claimed in claim 4 wherein said interpolymer component comprises from about 30 to 60 percent by weight ethyl acrylate, from about 20 to 60 percent by weight combined styrene, and from about 5 to 15 percent by weight combined acrylic acid.

6. Organic solvent soluble coating composition claimed in claim 4 wherein said interpolymer component comprises from about 30 to 60 percent by weight ethyl acrylate, from about 20 to 60 percent by weight combined styrene, and from about 5 to 15 percent by weight combined acrylic acid.

7. Water soluble coating composition claimed in claim 4 wherein said interpolymer component comprises the water soluble aqueous ammonia reaction product of from about 30 to 60 percent by weight combined ethyl acrylate, from about 0 to 25 percent by weight combined styrene, from about 15 to 60 percent by weight combined methyl methacrylate, and from about 5 to 20 percent by weight combined acrylic acid.

8. Coating composition in claim 4 wherein said interpolymer has a reduced viscosity of from 0.15 to 0.3, measured as a 0.2 gram sample of the interpolymer in 100 milliliters of tetrahydrofuran at 25° C.

9. The cured coating composition claimed in claim 1.

References Cited by the Examiner

UNITED STATES PATENTS

| 2,906,724 | 9/1959 | Daniel | 260—856 |
| 3,082,184 | 3/1963 | Falgiatore et al. | 260—855 |
| 3,118,848 | 1/1964 | Lombardi et al. | 260—855 |
| 3,196,120 | 7/1965 | McLaughlin et al. | 260—855 |

MURRAY TILLMAN, *Primary Examiner.*
J. C. BLEUTGE, *Assistant Examiner.*

UNITED STATES PATENT OFFICE
CERTIFICATE OF CORRECTION

Patent No. 3,267,174                              August 16, 1966

John S. Fry et al.

It is hereby certified that error appears in the above numbered patent requiring correction and that the said Letters Patent should read as corrected below.

Column 7, second table, third column, line 4 thereof, for "5" read -- 4 --; column 11, line 25, after "impact" insert -- tests --; line 38, for "caimed" read -- claimed --; line 54, for "this" read -- the --.

Signed and sealed this 22nd day of August 1967.

(SEAL)
Attest:

ERNEST W. SWIDER                              EDWARD J. BRENNER
Attesting Officer                                    Commissioner of Patents